United States Patent
Goodson et al.

(10) Patent No.: US 7,044,324 B2
(45) Date of Patent: May 16, 2006

(54) COMPOSITE MATERIAL

(75) Inventors: Forrest R. Goodson, San Jose, CA (US); Hugh M. Reynolds, San Jose, CA (US)

(73) Assignee: United Technologies Corporation, Hartford, CT (US)

( * ) Notice: Subject to any disclaimer, the term of this patent is extended or adjusted under 35 U.S.C. 154(b) by 215 days.

(21) Appl. No.: 10/694,504

(22) Filed: Oct. 24, 2003

(65) Prior Publication Data

US 2005/0089689 A1    Apr. 28, 2005

(51) Int. Cl.
*F17C 1/06* (2006.01)
*B32B 27/04* (2006.01)
*B32B 27/38* (2006.01)

(52) U.S. Cl. .................. 220/589; 428/413

(58) Field of Classification Search ............ None
See application file for complete search history.

(56) References Cited

U.S. PATENT DOCUMENTS

| | | |
|---|---|---|
| 4,882,370 A | 11/1989 | Jordan et al. |
| 5,599,856 A | 2/1997 | Gardner |
| 5,648,407 A | 7/1997 | Goetz et al. |
| 5,822,838 A * | 10/1998 | Seal et al. .......... 29/469.5 |
| 6,054,221 A | 4/2000 | Weigel et al. |
| 6,379,799 B1 | 4/2002 | Almen |
| 6,410,127 B1 | 6/2002 | Kamae et al. |

OTHER PUBLICATIONS

Product Bulletin SC:2441-01, Resolution Performance Products, 2001.*
Product Bulletin SC:1183-02, Resolution Performance Products, 2001.*
List of Epon Resin Systems, Resolution Performance Products, 2000.*
Derwent Publications Ltd., Abstract of JP 63 162733 (Ube Ind Ltd.) Jul. 6, 1988.
Derwent Publications Ltd., Abstract of JP 11 147965 (Toho Rayon KK) Jun. 2, 1999.

* cited by examiner

*Primary Examiner*—Michael J. Feely
(74) *Attorney, Agent, or Firm*—Bachman & LaPointe, P.C.

(57) ABSTRACT

A composite material and method of manufacture involve a mixture of an epoxy resin and a hardener being essentially free of methylenedianiline and vinylcyclohexene dioxide. A fiber reinforcement is located within the matrix. Advantageously, the matrix has a glass transition temperature of at least 250° F. dry, the resin has a pre-hardening mixed viscosity of 500–1500 cP at 75° F., and the composite material has, upon hardening, an interlaminar shear strength of at least 6.5 ksi dry at 75° F. and at least 3.5 ksi dry at 250° F.

8 Claims, 2 Drawing Sheets

FIG. 1

Resin Composition (parts by weight)

| | A (Prior Art) | B (Prior Art) | C (Prior Art) | D | E | F | G | H | I |
|---|---|---|---|---|---|---|---|---|---|
| Epoxy | EPON 828 / 65 | EPON 828 / 65 | EPOLITE 2447 / 100 | EPON 826 / 100 | GY-6008 / 100 | MY-721 / 100 | ERL 4221 / 100 | ERL 4221 / 90 | MY-721 / 100 |
| Diluent | ERL 4206 / 35 | ERL 4206 / 35 | ERL 4206 / 5 | HELOXY-67 / 25 | RD 2 / 25 | HELOXY-67 / 45 | none | EPON 826 / 10 | none |
| Hardener | HT-972 / 39.5 | EPOLITE 2330 / 21.6 | EPOLITE 2330 / 23 | EPOLITE 2330 / 19.4 | EPOLITE 2330 HY-5200 / 19.4 | EPOLITE 2330 HY-5200 / 53.8 | EPOLITE 2330 HY-5200 / 19.0 | EPOLITE 2330 HY-5200 / 18.5 | EPOLITE 2330 HY-5200 / 35 |
| Catalyst | None | none | none | none | None | EPIKURE 537 / 0.5 | EPIKURE 537 / 1.0 | EPIKURE 537 / 1.0 | EPIKURE 537 / 0.12-0.13 |

FIG. 2
Composition and Composite Properties

| | A(Prior Art) | B(Prior Art) | C(Prior Art) | D | E | F | G | H | I |
|---|---|---|---|---|---|---|---|---|---|
| Viscosity (cP) | 500 | 560 | 520 @ 120 F | 1400 | 1400 | 1100 | 1140 | 1470 | 1000 @ 135 F |
| Pot life (hr) | 18 | 17 | 4 | 7 | 7 | 28 | >13 | >13 | 10 @ 135 F |
| RT Gel (hr) | 48 | 48 | 30 | 32 | 36 | TBD | <120 | TBD | TBD |
| B stage (hr) 120 F | 15 | 15 | 6 | 10 | 11 | 48 | 6-10 | >22 | TBD |
| B stage (hr) 140 F | 9 | 9 | - | TBD | TBD | 24 | 4-8 | TBD | 24 |
| Gel at 300 F, min | 7 | 5 | 5 | 4.5 | 4.4 | 5.9 | 2 | 1.9 | 20 |
| Tg, dry (F) | 330 | 320 | 405 | 290 | 290 | 336 | 374 | 371 | 409 |
| Tg, wet (F) | 248 | 248 | 252 | 231 | 231 | 263 | 256 | 349 | 395 |
| Resin moisture pickup after 48 hr water boil, 2.48 % | 3 | 3 | 1.57 | 3.3 | 3.3 | 2.9 | 3.7 | 3.1 | 1.6 |
| Density | 1.200/1.201 | 1.200/1.201 | 1.24 | 1.2117 | 1.2117 | 1.1864 | 1.2287/1.2251 | 1.23 | 1.24 |
| SBS, RT, Dry, ksi | 9.3 | 9.8 | 8.54 † | 8.6 | 8.6 | 8.7 | 10.4 | 7.7 | 8.8 † |
| SBS, RT, Wet, ksi | 9.1 | 9.2 | 8.0 † | 8.5 | 8.5 | 8.5 | 9.6 | 6.8 | 8.7 † |
| SBS, 250 F, Dry, ksi | 5.3 | 6 | 4.97 @ 350 F † | 4.9 | 4.9 | 5.3 | 7.4 | 6.3 | TBD @ 350 F † |
| SBS, 250 F, Wet, ksi | 3.4 | 3.8 | 3.68 @ 350 F † | 4 | 3.9 | 4.5 | 5.9 | 5 | 4.9 @ 350 F † |
| Composite moisture pickup after 48 hr water boil, % | 0.51 | 0.62 | 0.57 | 0.65 | 0.65 | 0.6 | 1 | 1 | 0.45 |
| 12 inch Pressure vessel fiber strength (ksi) using T-800HB-12000-40B fiber | 658-720 790-920 † | 654 | 826 † | 688.5 | 665 | 663 | 654 767 ‡ 825 † | 604 | 790 † |

† T1000GB fiber
‡ M30SC fiber

US 7,044,324 B2

COMPOSITE MATERIAL

BACKGROUND OF THE INVENTION (1) Field of the Invention

The invention relates to composite material. More particularly, the invention relates to fiber-reinforced, resin-based, composites.

(2) Description of the Related Art

A well-developed field exists in fiber-reinforced, resin-based, composites. Evolution in fiber technology has produced glass, aramid, carbon, and yet other fibers in a variety of forms including individual strands, woven line, woven fabric, and parallel strand bundles and tapes. Various resinous matrix materials have also been developed. Common resinous materials are epoxies, which may be mixed with a diluent to achieve a desired viscosity or other property and a hardener to cure the epoxy.

SUMMARY OF THE INVENTION

Toxicity concerns have arisen regarding a number of the constituents in various resin formulations. One particular potential toxic material is methylenedianiline (MDA). Another is vinylcyclohexene dioxide. MDA is commonly found in a variety of resin formulations where long pot life, elevated temperature cure (e.g., >200° F.), and excellent processing (e.g., viscosity <1500 cP with a useful pot life >4 hours) and mechanical properties (e.g., tensile strength >10,000 psi, modulus of 400,000 to 600,000 psi, and elongations of >2% at ambient conditions) are required. Vinylcyclohexene dioxide is also found in a variety of resin formulations where lower viscosity (e.g., <1500 cP at ambient conditions) and long pot life (e.g., >4 hours at ambient conditions) are required for processing ease but a high glass transition temperature (e.g., >250° F. dry) and fiber translation strength (e.g., >80% of the fiber tow strength) is required.

Accordingly, there is a need for viable resin compositions lacking MDA and vinylcyclohexene dioxide but which are suitable replacements for existing resins with those components.

One aspect of the invention involves a composite material having a matrix mixture of an epoxy resin and a hardener. The resin and hardener are essentially free of MDA and vinylcyclohexene dioxide. A fiber reinforcement is located within the matrix. The matrix has a glass transition temperature of at least 250° F. dry. The resin has a pre-hardening mix viscosity of 500–1500 cP at 75° F. The composite material has, upon hardening, an interlaminar shear strength of at least 6.5 ksi dry at 75° F. and at least 3 ksi dry at 250° F.

In various implementations, the composite material may have a fiber tensile strength of at least about 650 ksi. The fiber reinforcement may comprise an intermediate modulus (e.g., nominal fiber modulus of 30–48 msi), high tensile strength (e.g., nominal fiber tow strength >700 ksi) carbon fiber. Alternative fibers include other suitable organic or inorganic fiber such as aramid, rigid-rod chain molecules of poly(p-phenylene-2,6-benzobisoxazole) (aka PBO) or fiberglass (both E and S glass). The material may be used in a filament-wound pressure vessel. The vessel may be a space vehicle or missile combustion chamber or propellant or oxidizer tank. The matrix may harden to B-stage in less than 20 hours at a temperature of 100°–150° F.

Another aspect of the invention involves a method for manufacturing a composite material. A blend is formed of a resin and a hardener. The resin may be selected from the group consisting of low viscosity bisphenol A/epichlorohydrin resins, low viscosity cycloaliphatic resins, and low viscosity tetra functional epoxy resins. The hardener may be selected from the group consisting of liquid aromatic amine hardeners effective to provide glass transition temperatures in excess of 250° F. The blend may be essentially free of MDA and vinylcyclohexene dioxide. A fiber reinforcement is embedded in the blend. The fiber-reinforced blend is cured to form the composite material having an interlaminar shear strength of at least 6.5 ksi dry at 75° F. and 3.5 ksi dry at 250° F. and a fiber tensile strength of at least 650 ksi in a filament-wound pressure vessel at 75° F. Exemplary viscosity for the low viscosity bisphenol A/epichlorohydrin resins is <11,000 cP at 75° F. Exemplary viscosity for the cycloaliphatic resins is <1000 cP. Exemplary viscosity for the tetra functional epoxy resins is <6000 cP at 120°–125° F.

In various implementations, the fiber reinforcement may be a high tensile strength intermediate modulus carbon fiber. The method may further comprise forming the blend with a reactive diluent comprising diglycidyl ether of 1,4-butanediol. The diluent may also be essentially free of MDA and vinylcyclohexene dioxide. One may further comprise a liquid amine cure catalyst comprising alkylated onium salt, substituted sulfur compound, substituted sulfide, ethylthioethanol, and fluoroboric acid.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a table of various resin compositions.

FIG. 2 is a table of material properties of the resin compositions of FIG. 1 and associated composites.

Like reference numbers and designations in the various drawings indicate like elements.

DETAILED DESCRIPTION

In FIGS. 1 and 2, three examples (A–C) of prior art resin formulations are identified. FIG. 1 identifies resin compositions and FIG. 2 identifies properties of the compositions and resulting composites. Example A is characterized by excellent resin dominated properties such as interlaminar shear (e.g., >6500 psi at ambient conditions and >3500 psi at 250° F.) and excellent fiber tensile strength translation in a filament-wound pressure vessel as indicated by high hoop fiber tensile strength (e.g, >650,000 psi (FIG. 2)) for typical use in solid rocket motor combustion chambers associated with various applications such as space motors, ballistic missiles, and tactical missiles. Exemplary applications include rocket motor combustion chambers and fuel or oxidizer tanks for missiles and space vehicles wherein the tanks are subject to only moderate aeroheating.

Example A utilizes EPON™ resin 828, a bisphenol-A liquid epoxy of high viscosity and maximum Gardner color of 1 with a viscosity of 110–150 poise at 25° C. and a combining equivalent weight ("epoxy equivalent") of 185–192 weight per epoxide and is available from Resolution Performance Products, LLC, Houston, Tex. As a diluent, Example A features ERL 4206, a vinylcyclohexene dioxide epoxy plasticizer available from Structure Probe, Inc., West Chester, Pa. As a hardener, Example A features HT972, a 4,4'-methylenedianiline, available from Fuchs s.r.l.—S. Giuliano Milanese (MI), Italy. No additional catalyst is used. In Example A, this resin is used in combination with carbon fiber. T-800HB and T-1000 GB carbon fiber are available from Toray Carbon Fibers America, Inc., Decatur, Ala. In alternate examples (not shown) aramid fiber may be used in lieu of or in addition to the carbon fiber.

Example B may have similar uses to Example A. It features the same epoxy and diluent as Example A but features EPOLITE™ 2330 hardener, a liquid eutectic mixture of m-phenylendediamine and an amine-terminated polymer available from Fiber-Resin Corp., Saint Paul, Minn. 55126. It is a dark amber liquid or crystalline solid aromatic amine epoxy curing agent containing no MDA with a viscosity of 25000–35000 cP at 75° F. and a hydrogen equivalent weight of 31.7.

Example C is suited for higher temperature applications than Examples A and B. Such applications may involve missiles subject to relatively high aeroheating (e.g., relatively high speed missiles including advanced surface-to-air missiles, antiballistic missile (ABM) missiles, and strategic missiles). It features a similar diluent and hardener to Example B but uses EPOLITE™ 2447 resin. A key property of this resin system is a glass transition or softening temperature that exceeds 400° F. while providing excellent resin dominated properties such as interlaminar shear (e.g., >6500 psi ambient and >4500 psi at 350° F.) useful structural properties (e.g., tension, compression and shear) up to temperatures in excess of 500° F. and excellent hoop fiber tensile strength in filament-wound pressure vessels (e.g., >650,000 psi).

Examples D–I identify six exemplary MDA and vinylcyclohexene dioxide-free compositions. Examples D–H would be suitable as replacements for Examples A and B. Example I would be a suitable replacement for Example C.

Example D features EPON™ resin 826, a bisphenol-A liquid epoxy of low viscosity and light color with viscosity of 4.5 poise at 120° F. and has an epoxy equivalent of 178–186. It also features HELOXY™ 67, a reactive diluent made of diglycidyl ether of 1,4-butanediol used as a viscosity reducer in epoxy resins which has a viscosity of 13–18 cP at 75° F. and an epoxy equivalent of 120–135, available from Resolution Performance Products, LLC.

Example E features GY-6008 resin (aka Ciba-Geigy 6008), a low viscosity bisphenol-A epoxy resin similar to EPON 826 (viscosity of 6500–9500 cP at 75° F. and an equivalent weight of 177–188), available from Ciba Specialty Chemicals, Suffolk, Va. As a diluent, it features RD-2, a diluent similar to HELOXY-67 (viscosity of 15–24 cps at 75° F. and an equivalent weight of 125–140), Huntsman, LLC, Salt Lake City, Utah.

Example F features MY-721 resin, a tetra functional epoxy resin with low viscosity and brown in color, suitable for filament winding with a viscosity at 120 F of 300–6000 cP and an equivalent weight of 109–115, available from Ciba Specialty Chemicals. As a hardener, it features HY-5200, a low viscosity non-MDA-based aromatic diamine with viscosity of 160 cP at 75° F. and a hydrogen equivalent weight of 44.5, available from Ciba Specialty Chemicals. As a catalyst, it further features EPIKURE™ (sometimes EPI-CURE) 537, a cure catalyst for aromatic diamine cured epoxy resins and containing no MDA with viscosity of 6–25 poise at 75° F., available from Resolution Performance Products, LLC. Epikure 537 is believed to be a proprietary composition containing alkylated onium salt, substituted sulfur compound, substituted sulfide, ethylthioethanol, and fluoroboric acid. It is believed to have a minimal effect on the cured epoxy resin and mechanical properties (e.g., less than 10% effect on tensile strength, modulus, elongation, and glass transition temperature) while improving mixed resin processing characteristics relating to increased room temperature pot life (e.g., >20 hr) and reduced low temperature gel time (<20 hr at 120° to 140° F.).

Example G features ERL-4221 resin, a low viscosity epoxy resin liquid cycloaliphatic epoxide whose chemical name is 3,4-epoxycyclohexyl-methyl-3,4-epoxy-cyclo-hexane-carboxylate, that is generally used as a reactive diluent, with a viscosity of 350–450 cP at 75° F. and an epoxy equivalent weight of 131–137, available from Union Carbide Co., a subsidiary of Dow Chemical Co., Midland, Mich. M30SC carbon fiber is available from Toray Carbon Fibers America, Inc.

Example H also uses ERL-4221 resin with EPON resin 826 used as a diluent along with EPOLITE 2330 as a hardener and EPIKURE 537 as a cure catalyst.

Example I features MY-721 resin with no additional diluent. It uses HY-5200 as a hardener and EPIKURE 537 as a cure catalyst.

In general, it is desirable that the mixed resin have a viscosity of 500–1500 cP at room temperature (e.g., 75° F.) or other processing temperature (e.g., to 150° F.). An advantageous pot life is preferably at least 4 hours and more preferably at least 8 hours. A glass transition temperature (TG) is advantageously at least 250° F. dry and 220 F wet (i.e., saturated with water). A cure temperature is advantageously compatible with standard manufacturing processes, for example, less than 400° F. The composition advantageously has a reasonable low temperature hardening time. For example, at a cure temperature in the range of 100° F.–150° F., the composition would harden to B-stage (an intermediate stage in the reaction of a thermosetting resin in which the material is sufficiently cross-linked that it will soften, and not flow, when heated) in less than 20 hours.

The composite material advantageously has an interlaminar shear strength of at least 6500 psi dry at room temperature and at least 3500 psi dry at an exemplary elevated temperature of 250° F. The fiber tensile strength (e.g., tensile strength in a twelve inch diameter filament-wound pressure vessel) is advantageously at least 650,000 psi (650 ksi).

One or more embodiments of the present invention have been described. Nevertheless, it will be understood that various modifications may be made without departing from the spirit and scope of the invention. For example, the particular properties of the resins and the associated fibers may be chosen in view of a desired application. Accordingly, other embodiments are within the scope of the following claims.

What is claimed is:

1. A composite material comprising:
   a matrix mixture of an epoxy resin and a hardener, the epoxy resin and hardener being essentially free of methylenedianiline (MDA) and vinylcyclohexene dioxide; and
   a filament-wound fiber reinforcement within the matrix, wherein:
   the matrix has a glass transition temperature of at least 250° F. dry; and
   the resin has a pre-hardening mixed viscosity of 500–1500 cP at 75° F.; and
   the composite material has, upon hardening, an interlaminar shear strength of at least 6.5 ksi dry at 75° F. and at least 3.5 ksi dry at 250° F.

2. The material of claim 1 wherein:
   the composite material has a fiber tensile strength of at least 650 ksi; and the fiber reinforcement comprises an intermediate modulus, high tensile strength, carbon fiber.

3. The material of claim 1 used in a filament-wound pressure vessel.

4. The material of claim 3 wherein the vessel is:
a combustion chamber;
or a propellant or oxidizer tank, said chamber or tank being on a space vehicle or on a missile.

5. The material of claim 1 wherein:
the matrix hardens to B-stage in less than 20 hours at a temperature of 100°–150° F.

6. A method for manufacturing a composite material comprising:
forming a blend of:
a resin selected from the group consisting of low viscosity bisphenol A/epicblorohydrin resins, low viscosity cycloaliphatic resins, and low viscosity tetra functional epoxy resins; and
a hardener selected from the group consisting of liquid aromatic amine hardeners effective to provide glass transition temperatures in excess of 250° F., the blend being essentially free of methylenedianiline (MDA) and vinylcyclohexene dioxide; embedding fiber reinforcement in the blend; and
curing the fiber-reinforced blend to form the composite material having an interlaminar shear strength of at least 6.5 ksi dry at 75° F. and 3 ksi dry at 250° F. and a fiber tensile strength of at least 650 ksi in a filament-wound pressure vessel at 75° F.

7. The method of claim 6 wherein the fiber reinforcement is a high tensile strength intermediate modulus carbon fiber and the method further comprises forming the blend with a reactive diluent comprising diglycidyl ether of 1,4-butanediol, the diluent also being essentially free of(MDA) and vinylcyclohexene dioxide.

8. The method of claim 6 wherein:
the blend further comprises a liquid amine cure catalyst comprising alkylated onium salt, substituted sulfur compound, substituted sulfide, ethylthioethanol, and fluoroboric acid.

* * * * *